United States Patent [19]

Anscher

[11] 4,188,178

[45] Feb. 12, 1980

[54] INTERNALLY THREADED PLASTIC NUT

[76] Inventor: Bernard Anscher, 21 Elm St., Woodbury, N.Y. 11797

[21] Appl. No.: 882,112

[22] Filed: Feb. 28, 1978

[51] Int. Cl.² .............................................. B29C 1/14
[52] U.S. Cl. .................................. 425/469; 425/447; 425/468
[58] Field of Search ............... 425/175, 180, 460, 469, 425/447, 441, 468; 249/160, 184

[56] References Cited

U.S. PATENT DOCUMENTS

| | | | |
|---|---|---|---|
| 2,256,769 | 9/1941 | Amrine | 425/468 X |
| 2,317,823 | 4/1943 | Strauss | 425/447 X |
| 3,618,170 | 11/1971 | Owens | 425/468 X |
| 3,849,053 | 11/1974 | Bruce et al. | 425/468 X |

*Primary Examiner*—Robert L. Spicer, Jr.
*Attorney, Agent, or Firm*—Kenyon & Kenyon

[57] ABSTRACT

A plastic wing nut with an internal thread, a mold therefor and a method of molding such a wing nut in which the wing nut is molded so as to have only a single internal thread thereby greatly simplifying the molding process is disclosed.

2 Claims, 4 Drawing Figures

INTERNALLY THREADED PLASTIC NUT

BACKGROUND OF INVENTION

This invention relates to molded nuts in general and more particularly to a molded nut which contains a single internal thread.

Nuts such as wing nuts which have typically been made of metal such as steel, brass and aluminum, for certain applications, are now being molded out of plastic materials such as nylon. Heretofore, such nuts have been formed by one of three different methods. A first method comprises molding the nut without threads and then tapping a thread into the molded part. The disadvantage of this method is obvious in that it requires the additional step of tapping. A second method comprises using an unscrewing mold in which the thread is formed by a male-thread member which is then screwed out of the part using hydraulic or mechanical means after molding is completed. This mold, of course, is more complex and requires the additional means to remove the threaded member on completion of molding. The third manner in which internal threads are formed is through the use of a collapsible core during molding. The collapsible core method forms the internal thread using two or more segments of a male member that forms partial threads and then it is collapsed and removed from the molded part. The disadvantage of this molding method, in addition to the need to have means in the mold to collapse and expand the core, is that the threads are only partial.

Thus, from the molding standpoint, the first method, in which a simple mold is used, i.e., where there is no need for means to unscrew a mold or collapse a mold, is the easiest. However, as noted above, it suffers from a disadvantage in that an additional step of tapping is required. Thus, it becomes apparent that if it were possible to mold a threaded nut, such as a wing nut with a simple mold and without the need for further tapping, the overall cost of production of nuts of this type could be substantially reduced.

SUMMARY OF THE INVENTION

It is, thus, the object of the present invention to provide an improved nut which can be easily molded without the requirement for complex molds.

This is accomplished by molding a nut having only a single internal thread. Surprising, it has been found that in most applications such a single internal thread has sufficient holding power and even acts to a degree as a lock nut. Tests have shown that the forces necessary to strip a wing nut made in accordance with the present invention are not substantially less than the forces requires to strip a nut of similar size which was molded and then tapped. Further, even after being stripped, the nut of the present invention retains a good degree of holding power. In addition, with the nut of the present invention a certain amount of self tapping takes place in the area above the single thread as the nut is threaded onto a male member, giving additional holding power.

The molding process is reasonably simple. Female molds with the shape of the nut itself are utilized along with male mold members, i.e. cores, for forming the internal diameter of the nut. Each of the male members contains half of a single thread. In this manner, on completion of the molding, the male members are simply withdrawn, there being no need for unscrewing or collapsing. This greatly simplifies and at the same time speeds up the manufacturing process.

DETAILED DESCRIPTION OF THE INVENTION

Figure 1:
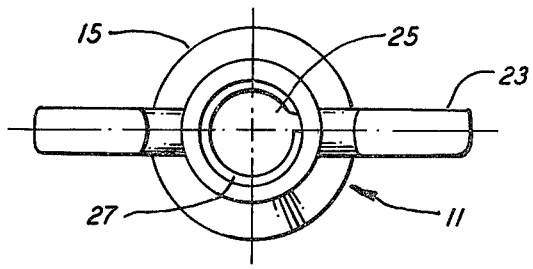
FIG. 1 is a plan view of the wing nut of the present invention.
Figure 2:
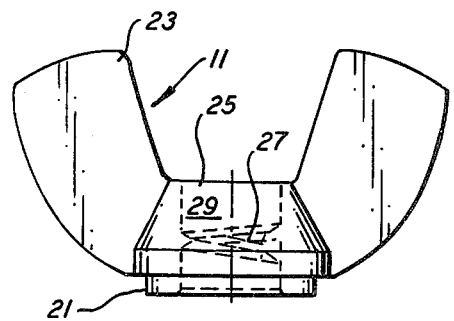
FIG. 2 is an elevation view of the same wing nut.
Figure 3:
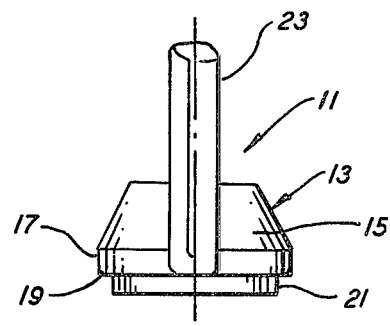
FIG. 3 is an end view of the wing nut of FIGS. 1 and 2.

Wing nut 11 of the present invention is illustrated by FIGS. 1, 2 and 3. The nut is of one piece of molded construction molded of a material such as nylon 6/6, nylon 6, acetal, polyester, polycarbonate, polyethylene, polypropylene or ABS. The wing nut includes a body portion 13 having its top part 15 shaped as a truncated cone and a bottom in the form of a cylindrical part 17 with a radius 19 at the very bottom. Below this section is a cylindrical portion 21. Extending from the body 13 are two wings 23 of conventional shape.

The nut contains a central bore 25 into which is molded a single thread 27, i.e., what is meant by a single thread is a thread which extends 360°, a half-thread thus extending 180°. As noted above, it has been found, surprisingly, that such a single thread has sufficient holding power for most applications in which nuts of this type are used and that it will continue to hold even when stripped. Furthermore, by making the portion 29 of the bore of a slightly smaller size, a certain amount of self tapping can be achieved within the nut to give further holding power.

Figure 4:
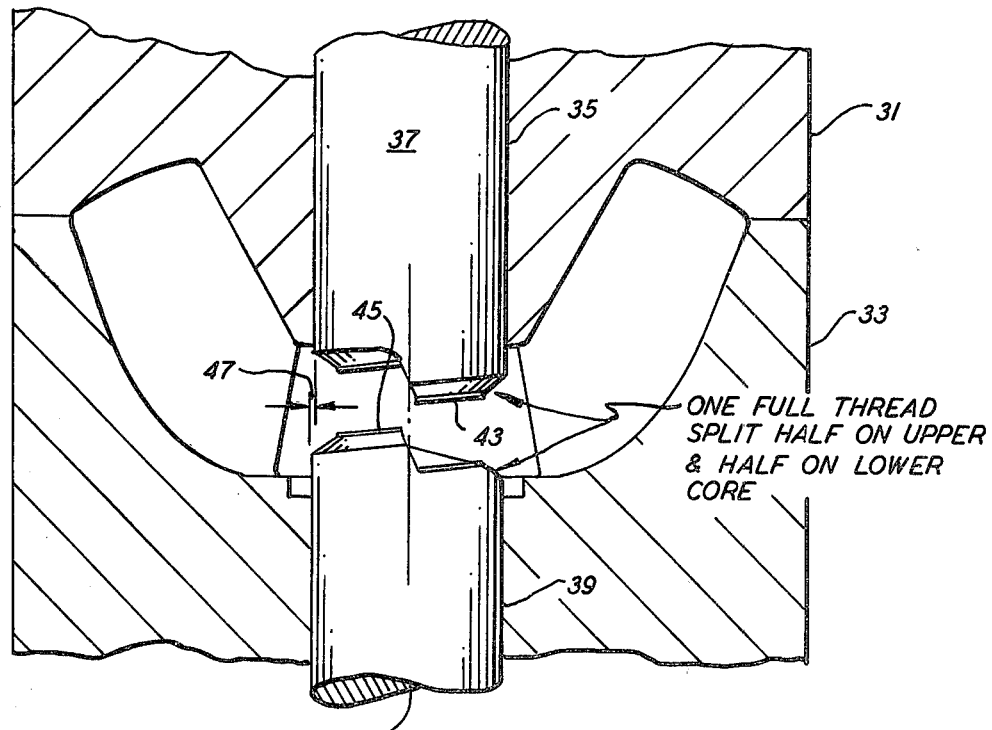
FIG. 4 is a cross-sectional view showing the basic construction of the mold for making the wing nut of the present invention.

FIG. 4 illustrates the basic elements of the mold used in molding the nut of the present invention. Not all of the mold details are shown since, in general, the constructions of molds of this general type are well known to those skilled in the art. Basically, the mold includes an upper female mold part 31 and a lower female mold part 33. These two parts of the mold when brought together form a recess in the shape of the external surfaces of the nut shown on FIGS. 1, 2 and 3. The upper mold part 31 contains a bore 35 for the insertion of a male mold member 37. Similarly there is a bore 39 in the lower mold part 33 for the insertion of a male mold member 41. These members 37 and 41 are what are known in the art as cores.

In the prior art mentioned above in which a wing nut is molded without threads, a straight cylindrical core or pair of cores would be used for molding the central recess. However, in accordance with the present invention, each of the cores 37 and 41 contains, on its end, half a thread, i.e., the half thread 43 on the core 37 and the half thread 45 on the core 41. In the figure, the cores are shown partially separated to illustrate this better. When brought together they mate and form a single thread within the recess. After the mold parts 31 and 33 are brought together and the cores 37 and 41 placed therein abutting against each other, the remaining space is filled with the material to be molded in conventional fashion. This material fills the recess 34 including filling around the cores 37 and 41 and the thread is formed thereby. When the material has solidified, the cores 37 and 41 are removed and the mold parts 31 and 33 separated resulting in the nut shown on FIGS. 1-3.

There is no unscrewing or collapsing necessary. Because each core 37 and 41 contains only one-half thread it can simply be withdrawn from the molded nut without anything further being done. Naturally, the cores can be sized to mold any size thread either right hand or left hand. Similarly different mold parts 31 and 33 can be provided for molding different size wing nuts. Similar mold can be used for molding conventional hexagonal nuts It should be noted, that the present invention is thought to be particularly applicable to a wing nut such as the wing nut which has been illustrated. However, there may be applications for a conventional hexagonal nut which can be molded with a single thread and such is to be considered within the scope of the present invention.

Also illustrated by FIG. 4 is the slight difference in diameter between the core 37 and the core 41 indicated by the gap 47. Thus, the upper portion 29 of the bore 25 in the wing nut will have smaller diameter than the rest of the bore. As a result, as the nut is screwed on to a bolt, a certain self tapping will take place in this location to aid in the holding power of the nut.

I claim:

1. In a mold for molding a plastic nut which includes a mold cavity and at least one core member for molding internal threads in the nut, an improved core assembly comprising a first core member having on the end thereof only one-half thread and a second core member having on the end thereof only a second half-thread and shaped to mate with said first core member to form one single thread, said core members having their axes aligned and adapted to abut against each other during molding, whereby, a nut may be molded with a single thread therein using core members which can be simply, linearly inserted and removed from said mold cavity.

2. A core assembly for use in making plastic molded nuts comprising a first core member having on the end thereof only one-half thread and a second core member having on the end thereof only a second half-thread and shaped to mate with said first core member to form one single thread when said core members are in axial alignment and abut against each other, whereby, using said core assembly with a mold cavity, a nut may be molded with a single thread therein using core members which can be simply, linearly inserted and removed from said mold cavity.

* * * * *